United States Patent [19]

Pirner et al.

[11] 4,232,095
[45] Nov. 4, 1980

[54] FILLER METAL IN A WELDED ASSEMBLY

[75] Inventors: Miroslav Pirner, Neuhausen am Rheinfall; Heinrich Zoller, Aesch; Heinz Bichsel, Neuhausen am Rheinfall, all of Switzerland

[73] Assignee: Swiss Aluminium Ltd., Chippis, Switzerland

[21] Appl. No.: 16,927

[22] Filed: Mar. 2, 1979

Related U.S. Application Data

[63] Continuation of Ser. No. 914,531, Jun. 12, 1978, abandoned.

[30] Foreign Application Priority Data

Jun. 29, 1977 [CH] Switzerland ............... 7983/77

[51] Int. Cl.³ .............................................. B32B 15/20
[52] U.S. Cl. .................................. 428/654; 75/141

[58] Field of Search ............... 75/141, 146; 428/654

[56] References Cited

U.S. PATENT DOCUMENTS 2,245,167  6/1941  Stroup .................. 75/141

Primary Examiner—R. Dean
Attorney, Agent, or Firm—Robert H. Bachman

[57] ABSTRACT

Filler metal for welding AlZnMg type alloys raises the resistance to stress corrosion without increasing the susceptibility to exfoliation corrosion. The composition of the filler metal includes a copper addition which suppresses weld boundary corrosion while additions of manganese, titanium, chromium and zirconium inhibit weld cracking. High weld strengths are attained using the said filler metal.

10 Claims, No Drawings

FILLER METAL IN A WELDED ASSEMBLY

This is a Continuation, of application Ser. No. 914,531, filed June 12, 1978 abandoned.

BACKGROUND OF THE INVENTION

The invention concerns a filler metal for welding aluminum alloys, in particular for welding alloys of the AlZnMg type.

AlZnMg alloys have found wide application because of their good weldability, in particular because the weld region hardens at room temperature to the strength level of the parent metal. Initial difficulties, which were due to poor resistance to stress corrosion, were overcome by choosing the appropriate alloy composition, for example, by having an appropriate Zn/Mg ratio and by suitable heat treatment, for example, multi-stage artificial aging.

It is also known that additions of copper in amounts up to 2.0% to the AlZnMg type alloy raises the strength and to a large extent prevents stress corrosion cracking from occurring.

In using these alloys in welded constructions, however, it has been found that the welds meet the requirements regarding stress corrosion and exfoliation corrosion susceptibility only when the construction has been heat treated as a whole. It has been found impossible to comply with this requirement, in particular in the case of large welded constructions.

Various efforts have been made to improve the corrosion resistance of the weld by means of suitable filler metals. Thus, for example, in the Aluminium Taschenbuch, 13th issue, Page 551, non age-hardenable alloys of the type AlSi, AlMg and AlMgMn have been suggested for welding AlZnMg 1. The corrosion problems are indeed solved this way, but only low weld strengths can be achieved with these materials. It is clear, therefore, that the high strength values which can be reached with AlZnMg alloys in welded constructions cannot be exploited with these materials.

Attempts have already been made to use AlZnMg alloys as filler metal. Thus, for example, in the German Pat. DT-OS No. 22 34 111, an age-hardenable aluminum filler metal of the following composition has been proposed: zinc from 2.0 to 6.0%, magnesium from 1.5 to 5.0%, chromium from 0.1 to 0.7%, silver from 0.05 to 1.04%, bismuth from 0.001 to 1.0%, beryllium from 0.001 to 1.0%, zirconium from 0.05 to 0.2%, less than 0.4% manganese, less than 0.2% silicon, less than 0.5% iron, and less than 0.08% copper.

The mechanical properties in the weld which can be achieved with this filler metal are comparable with those of the parent metal. This filler metal also allowed the requirements regarding stress corrosion susceptibility to be satisfied to a large degree. It has been found, however, that in spite of optimal heat treatment of the welded construction, there is relatively large susceptibility to weld boundary corrosion. Therefore, although adequate strength values are obtained with such welds, there are risks involved in their use in corrosive surroundings.

SUMMARY OF THE INVENTION

The inventor set himself the task of developing a filler metal which produces welds of the same strength as the parent metal and at the same time having good corrosion resistance in corrosive environments.

The object of the invention is fulfilled by way of the novel aluminum base alloy of the present invention, and specifically by way of a filler metal consisting essentially of: zinc from 1.0 to 4.0%, magnesium from 2.0 to 5.0%, copper from 0.2 to 0.5%, manganese from 0.3 to 0.5%, titanium from 0.05 to 0.2%, chromium from 0.05 to 0.3%, zirconium from 0.05 to 0.2% and balance aluminum. The alloy of the present invention also should contain less than 0.3% silicon and less than 0.4% iron.

DETAILED DESCRIPTION

It was found, surprisingly, in accordance with the present invention that filler metals based on AlZnMg alloys can be used for welding AlZnMg alloys without the previously mentioned disadvantages being encountered, when the filler metal contains the elements copper, manganese, titanium, chromium and zirconium in the amounts according to the present invention. It is assumed that above all the copper addition prevents both the occurrence of stress corrosion and weld boundary corrosion, and that the amounts of manganese, titanium, chromium and zirconium are responsible for reducing susceptibility to weld cracking. Metallographic investigations have shown that the copper addition influences the cast structure during solidification of the weld bead, and consequently influences the boundary between the weld bead and the parent metal, in such a way that stress corrosion and in particular weld boundary corrosion are to a large extent avoided.

These tests also showed that the following preferred alloying ranges influence the susceptibility to corrosion and weld cracking in a particularly favorable manner.

Zinc—2.7 to 3.3%
Magnesium—3.7 to 4.3%
Copper—0.25 to 0.35%
Manganese—0.35 to 0.45%
Titanium—0.08 to 0.15%
Chromium—0.12 to 0.20%
Zirconium—0.12 to 0.20%
Silicon—less than 0.2%
Iron—less than 0.3%
Aluminum—Balance Particularly surprising was that the filler metal with the amount of copper added in accordance with the present invention raised the resistance of the weld to stress corrosion considerably, without causing a corresponding increase in susceptibility to exfoliation corrosion in the heat affected zone in the parent metal.

The filler metal of the invention has also been found to be suitable for welding constructional parts of AlZnMg alloys to parts made out of other types of alloys, such as, e.g., AlMn or AlMg alloys.

Furthermore, it has been found that by adding copper in amounts of the order of 0.2 to 0.5% to the filler metals according to DIN 1732, sheet 1, in particular to filler metals of the types AlMg, AlMn and AlMgMn, weld connections which are to a large degree resistant to stress corrosion cracking can be attained.

The advantages of the weld filler metal of the invention will now be illustrated in some detail by means of the following examples.

EXAMPLE I

Samples of 4 mm thick, naturally aged sheet of an AlZnMg 1 alloy were welded with the aluminum base alloy filler metals of composition given in Table I using MIG-pulsed-arc welding. The welds were then tested for comparison purposes.

TABLE I

| Filler Metal | Zn | Mg | Cu | Ag | Mn | Ti | Cr | Zr | Si | Fe |
|---|---|---|---|---|---|---|---|---|---|---|
| A | 1.9 | 4.1 | 0.03 | — | 0.45 | 0.10 | 0.12 | — | 0.08 | 0.40 |
| B | 2.2 | 4.0 | 0.05 | 0.95 | 0.48 | 0.11 | 0.11 | 0.12 | 0.10 | 0.41 |
| C | 2.8 | 4.2 | 0.29 | — | 0.44 | 0.10 | 0.18 | 0.17 | 0.21 | 0.38 |

The filler metals A and B are conventional, known filler metals; the filler metal C has the composition in accordance with the present invention.

After welding the samples were artificially aged in a conventional manner.

The results of the testing are given in Table II.

TABLE II

| Filler Metal | Strength of the Weld (N/mm$^2$) | Average Lifetime of the Jones test pieces (days) |
|---|---|---|
| A | 332 | 9 |
| B | 309 | 32 |
| C | 334 | 84 |

As Table II shows, the filler metal prepared in accordance with the present invention exhibited a considerably improved resistance to corrosion.

EXAMPLE II

This example shows the results of testing welds in 4 mm thick sheet of an artificially aged AlZnMg 1 alloy, prepared using filler metal according to DIN 1732 and a filler metal according to the present invention and by means of various welding methods. The compositions of the filler metals are given in Table III.

TABLE III

| Filler Metal | Mg | Mn | Cu | Cr | Zn | Ti | Fe | Si |
|---|---|---|---|---|---|---|---|---|
| D | 4.9 | 0.35 | 0.05 | 0.12 | 0.12 | 0.17 | 0.38 | 0.30 |
| E | 4.8 | 0.35 | 0.31 | 0.15 | 0.15 | 0.14 | 0.25 | 0.20 |

Filler metal D corresponds to DIN 1732; filler metal E contains the copper content in accordance with the invention.

The results of testing the welds for mechanical strength and corrosion resistance are given in Table IV.

TABLE IV

| Filler Metal | Welding Method | Weld Strength (N/mm$^2$) | Average Lifetime of Jones test pieces (days) |
|---|---|---|---|
| D | TIG,DC (Helium) | 336 | 24 |
| E | TIG,DC (Helium) | 337 | 90 |
| D | MIG-Pulsed-Arc | 305 | 21 |
| E | MIG-Pulsed-Arc | 305 | 52 |

The corrosion resistance of the welds prepared using the filler metal composition of the present invention was markedly superior to those prepared using the filler metal in accordance with DIN 1732. This was particularly so in the case of the TIG, DC-Helium weld.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A filler metal in a welded assembly with aluminum alloys, said filler metal consisting essentially of: zinc from 1.0 to 4.0%; magnesium from 2.0 to 5.0%; copper from 0.2 to 0.5%; manganese from 0.3 to 0.5%; titanium from 0.05 to 0.2%; chromium from 0.05 to 0.3%; zirconium from 0.05 to 0.2%; balance aluminum, said filler metal producing welded aluminum assemblies wherein the weld has the same strength as the parent metal plus has resistance to weld boundary corrosion, weld cracking and stress corrosion without a corresponding increase in susceptibility to exfoliation corrosion in the heat affected zone.

2. A filler metal according to claim 1 containing less than 0.3% silicon and less than 0.4% iron.

3. A filler metal according to claim 2 wherein the zinc content lies between 2.7 and 3.3%.

4. A filler metal according to claim 2 wherein the magnesium content lies between 3.7 and 4.3%.

5. A filler metal according to claim 2 in which the copper content lies between 0.25 and 0.35%.

6. A filler metal according to claim 2 in which the manganese content lies between 0.35 and 0.45%.

7. A filler metal according to claim 2 in which the titanium content lies between 0.08 and 0.15%.

8. A filler metal according to claim 2 in which the chromium content lies between 0.12 and 0.20%.

9. A filler metal according to claim 2 in which the zirconium content lies between 0.12 and 0.20%.

10. A filler metal according to claim 1 for welding aluminum alloys of the AlZnMg type consisting of: zinc from 2.7 to 3.3%; magnesium from 3.7 to 4.3%; copper from 0.25 to 0.35%; manganese from 0.35 to 0.45%; titanium from 0.08 to 0.15%; chromium from 0.12 to 0.20%; zirconium from 0.12 to 0.20%; silicon less than 0.2%; iron less than 0.3%; balance aluminum.

* * * * *